United States Patent
Kawakami et al.

(10) Patent No.: US 8,285,863 B2
(45) Date of Patent: Oct. 9, 2012

(54) ACCESS CONTROL DEVICE, ACCESS CONTROL METHOD, AND ACCESS CONTROL PROGRAM

(75) Inventors: Nobuo Kawakami, Tokyo (JP); Akihiko Koizuka, Koshigaya (JP); Ryuichiro Ban, Funabashi (JP)

(73) Assignee: Dwango Co., Ltd. (JP)

( * ) Notice: Subject to any disclaimer, the term of this patent is extended or adjusted under 35 U.S.C. 154(b) by 399 days.

(21) Appl. No.: 12/529,264

(22) PCT Filed: Feb. 28, 2008

(86) PCT No.: PCT/JP2008/053564
§ 371 (c)(1),
(2), (4) Date: Aug. 31, 2009

(87) PCT Pub. No.: WO2008/108279
PCT Pub. Date: Sep. 12, 2008

(65) Prior Publication Data
US 2010/0093418 A1    Apr. 15, 2010

(30) Foreign Application Priority Data
Mar. 2, 2007   (JP) ................................ 2007-053349

(51) Int. Cl.
*G06F 15/16* (2006.01)
(52) U.S. Cl. ...................................................... 709/229
(58) Field of Classification Search .................. 709/229, 709/225–226
See application file for complete search history.

(56) References Cited

U.S. PATENT DOCUMENTS

| | | | |
|---|---|---|---|
| 7,783,788 B1* | 8/2010 | Quinn et al. ..................... 710/8 |
| 2003/0033359 A1 | 2/2003 | Asoh | |
| 2004/0193723 A1* | 9/2004 | Kabatani ....................... 709/231 |
| 2005/0166142 A1* | 7/2005 | Mise et al. ..................... 715/517 |
| 2005/0169386 A1* | 8/2005 | Spalink et al. ............ 375/240.29 |
| 2005/0171857 A1* | 8/2005 | Belkoura ......................... 705/26 |
| 2008/0026694 A1* | 1/2008 | Ramanathan et al. .......... 455/39 |
| 2008/0205620 A1* | 8/2008 | Odinak et al. ............ 379/215.01 |
| 2009/0158375 A1* | 6/2009 | Rodriguez et al. ............. 725/115 |
| 2010/0177876 A1* | 7/2010 | Perrella et al. ............. 379/88.04 |
| 2011/0125867 A1* | 5/2011 | Denk, Jr. ........................ 709/217 |
| 2011/0307339 A1* | 12/2011 | Russell et al. ............. 705/14.66 |

FOREIGN PATENT DOCUMENTS

| | | |
|---|---|---|
| JP | 09-106381 | 4/1997 |
| JP | 2003-58499 A | 2/2003 |

(Continued)

OTHER PUBLICATIONS

Notice of Reasons for Rejection for Japanese Application No. 2007-053349 with English translation mailed on Oct. 19, 2010.
JP Notice of Allowance mailed Feb. 22, 2011 for Japanese Patent Application No. 2007-053349 with English Translation.

(Continued)

*Primary Examiner* — Larry Donaghue
(74) *Attorney, Agent, or Firm* — Cantor Colburn LLP

(57) ABSTRACT

An access control device which controls access to a server from a plurality of terminal devices includes a receiving section which receives requests from the terminal devices to access the server, a lottery section which conducts a lottery for the terminal devices making the access requests from among the access requests received by the receiving section, and a lottery result transmitting section which transmits connection destination information which is used to access the server to the terminal devices which were successful in the lottery conducted by the lottery section.

8 Claims, 3 Drawing Sheets

| USER ID | LOTTERY NUMBER | LOTTERY RESULT |
|---|---|---|
| 10010001 | 1001 | SUCCESSFUL |
| 10011002 | 1002 | SUCCESSFUL |
| 10011005 | 1401 | UNSUCCESSFUL |
| 10011009 | 1402 | UNSUCCESSFUL |
| 10011018 | 1503 | UNSUCCESSFUL |
| 10011029 | 1543 | SUCCESSFUL |
| 10011178 | 1608 | UNSUCCESSFUL |
| 10012101 | 1617 | UNSUCCESSFUL |
| 10012205 | 1674 | UNSUCCESSFUL |

FOREIGN PATENT DOCUMENTS

| | | |
|---|---|---|
| JP | 2003-208496 A | 7/2003 |
| JP | 2003-250142 | 9/2003 |
| JP | 2003-296269 A | 10/2003 |
| JP | 2004-159120 A | 6/2004 |

OTHER PUBLICATIONS

International Search Report for International Application No. PCT/JP2008/053564 mailed Apr. 15, 2008 with English Translation.

* cited by examiner

FIG. 3

| USER ID | LOTTERY NUMBER | LOTTERY RESULT |
|---|---|---|
| 10010001 | 1001 | SUCCESSFUL |
| 10011002 | 1002 | SUCCESSFUL |
| 10011005 | 1401 | UNSUCCESSFUL |
| 10011009 | 1402 | UNSUCCESSFUL |
| 10011018 | 1503 | UNSUCCESSFUL |
| 10011029 | 1543 | SUCCESSFUL |
| 10011178 | 1608 | UNSUCCESSFUL |
| 10012101 | 1617 | UNSUCCESSFUL |
| 10012205 | 1674 | UNSUCCESSFUL |

ACCESS CONTROL DEVICE, ACCESS CONTROL METHOD, AND ACCESS CONTROL PROGRAM

CROSS REFERENCE TO RELATED APPLICATIONS

This is a U.S. national stage of application No. PCT/JP2008/053564, filed on 28 Feb. 2008. Priority under 35 U.S.C. §119(a) and 35 U.S.C. §365(b) is claimed from Japanese Application No. 2007-053349, filed 2 Mar. 2007, the disclosure of which is also incorporated herein by reference.

TECHNICAL FIELD

The present invention relates to an access control device which controls access to a server, an access control method, and a storage medium which stores an access control program.

Priority is claimed on Japanese Patent Application No. 2007-53349, filed Mar. 2, 2007, the contents of which are incorporated herein by reference.

BACKGROUND ART

Conventionally, a system has been provided in which a server is provided on a network to deliver moving pictures, and contents of the moving pictures are streamed from the moving picture delivery server in response to an access made from a terminal device. The moving picture contents are then reproduced on the terminal device thereby enabling the moving pictures to be viewed. The number of users utilizing this type of moving picture delivery system has been increased in recent years and will probably be further increased in the future.

If the number of accesses to this type of moving picture delivery system is increased in conjunction with the increase in the number of users of the moving picture delivery system, then the load on the moving picture delivery server will also be increased.

Because of this, a system which restricts access to the server has been proposed, for example, in Patent document 1 described below.

[Patent document 1] Japanese Unexamined Patent Application, First Publication (JP-A) No. 2003-296269

DISCLOSURE OF INVENTION

Problem to be Solved by the Invention

In the system shown in Patent document 1, an access right is granted to a user, and a user having the access right is able to access a server. However, the structure of the server which controls the access rights becomes extremely complex when setting access rights for each user in this manner and controlling these access rights. Moreover, if access is uniformly restricted by strictly using the access rights, users not having access rights cannot access the server even if there is a surplus in the number of possible accesses in the case where, for instance, users having access rights do not actually access the server.

The present invention was made in view of the above described circumstances and it is an object thereof to provide an access control device, an access control method, and a storage medium which stores an access control program which can control access to the server such that the number of accesses becomes appropriate for the situation at that time.

Means for Solving the Problem

In order to solve the above described problems, the present invention provides an access control device which controls access to a server from a plurality of terminal devices, including: a receiving section which receives access requests from the terminal devices to access the server; a lottery section which conducts a lottery for the terminal devices making the access requests from among the access requests received by the receiving section; and a lottery result transmitting section which transmits connection destination information necessary to access the server to the terminal devices which are successful in the lottery conducted by the lottery section.

It is also possible for the access control device of the present invention to be provided with: an access situation notification receiving section which receives access situation notification showing that a terminal device is accessing the server from the terminal device making the access request; and an access situation storage section which stores lottery results from the lottery section in association with identification information for terminal devices making the access requests, wherein: the receiving section may determine whether or not the access situation notification is received within a predetermined time period by the access situation notification receiving section from the terminal devices having the identification information associated with the lottery results being set as successful in reference to the access situation storage section; and when it is determined that access situation notification is not received by the receiving section, the lottery section may conduct a new lottery targeting the terminal devices having the identification information associated with the lottery results being set as unsuccessful determined in reference to the access situation storage section.

In the access control device of the present invention, it is also possible for the lottery result transmitting section to transmit to terminal devices which are unsuccessful in the lottery connection destination information which allows the terminal devices to access another server different from the server.

An access control method of the present invention which is used by an access control device which controls access to a server from a plurality of terminal devices has steps of: receiving requests from the terminal devices to access the server; conducting a lottery for the terminal devices making the access requests from among the received access requests; and transmitting connection destination information necessary to access the server to the terminal devices which are successful in the lottery.

A computer-readable recording medium of the present invention stores an access control program which causes a computer which controls accesses to a server from a plurality of terminal devices to execute functions of: receiving requests from the terminal devices to access the server; conducting a lottery for the terminal devices making the access requests from among the received access requests; and transmitting connection destination information necessary to access the server to the terminal devices which are successful in the lottery.

Effect of the Invention

As is described above, according to the present invention, an access control device receives requests from the terminal devices to access the server, conducts a lottery for the terminal devices making the access requests from among the received access requests, and transmits connection destination information which is used to access the server to the terminal devices which are successful in the lottery. As a result, it is possible to control terminal devices which are accessing a server without access rights needing to be granted to each individual terminal device.

Moreover, according to an embodiment of the present invention, a determination is made as to whether or not an access situation notification has been received by an access situation notification receiving section within a predetermined time period from terminal device identification information which was set as being "successful" in the lottery results from among the information stored in the access situation storage section, and when it is determined that this access situation notification has not been received, another lottery is conducted aimed at terminal device identification information whose lottery result was previously "unsuccessful". As a result, it is possible to ascertain how many terminal devices may have been successful in a lottery but have not then subsequently actually accessed the server, and to then allow that number of other terminal devices to access the server.

Moreover, according to an embodiment of the present invention, connection destination information is transmitted to terminal devices which were unsuccessful in the lottery which allows them to access another server different from the server. As a result, they are able to view other contents while they wait until they are successful in the lottery.

BRIEF DESCRIPTION OF THE DRAWINGS

FIG. 3 is a diagram showing an example of information which is stored in an access situation database in an embodiment of the present invention.

REFERENCE SYMBOLS

Figure 1:
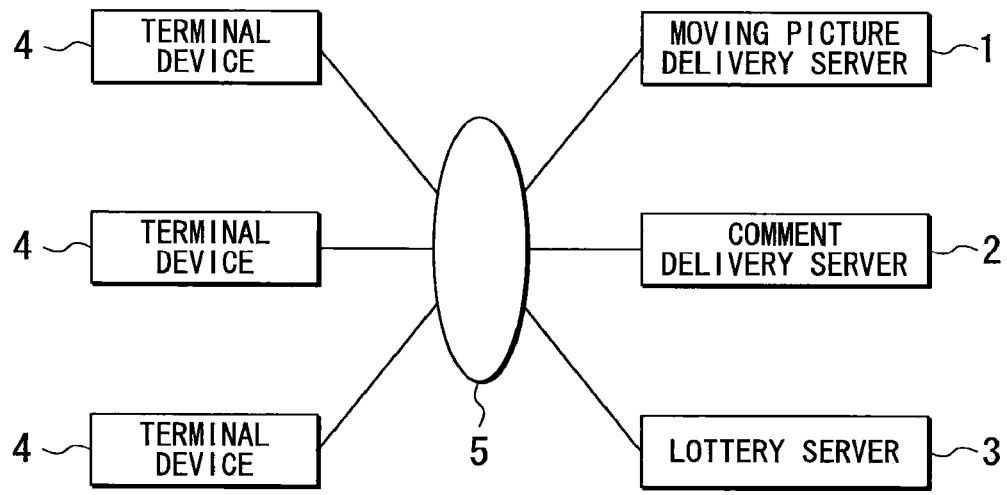
FIG. 1 is a block diagram showing the structure of an access control system according to an embodiment of the present invention.

1 Moving picture delivery server
2 Comment delivery server
3 Lottery server
4 Terminal device
31 Access monitoring section
32 Access situation database
33 Access situation notification receiving section
35 Lottery section
36 Lottery result transmitting section

BEST MODE FOR CARRYING OUT THE INVENTION

An access control system according to an embodiment of the present invention will now be described with reference to the drawings. FIG. 1 is a block diagram showing the structure of an access control system according to an embodiment of the present invention.

In FIG. 1, an access control system 1 includes a moving picture delivery server 1, a comment delivery server 2, a lottery server 3, and a plurality of terminal devices 4 which are connected via a network 5.

The moving picture delivery server 1 is a server whose purpose is to control the number of accesses. The moving picture delivery server 1 streams moving picture contents to terminal devices 4 which have been permitted access.

The comment delivery server 2 delivers to terminal devices 4 information which is able to be displayed superimposed on the contents which have been delivered from the moving picture delivery server 1. This comment delivery server 2 receives comment information which is transmitted from the terminal devices of users who are viewing the contents delivered from the moving picture delivery server 1, and also transmit the received comment information to other terminal devices 4 so that the comments can be commented on among users who are viewing the same contents.

The lottery server 3 conducts a lottery for terminal devices 4 which have requested access to the moving picture delivery server 1, and transmits the lottery results to the terminal devices 4 so that successful terminal devices 4 are able to access the moving picture delivery server 1 based on their successful lottery result.

A plurality of the terminal devices 4 are connected to the network 5.

Next, the structure of the lottery server 3 will be further described.

Figure 2:
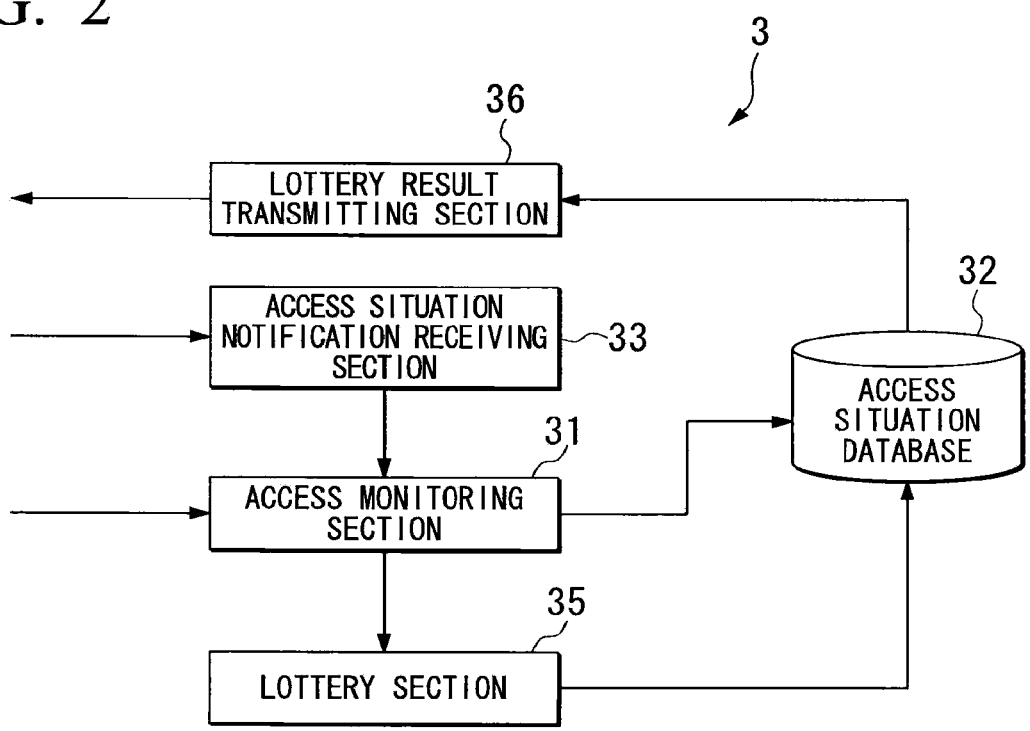
FIG. 2 is a block diagram showing the structure of a lottery server in an embodiment of the present invention.

FIG. 2 is a block diagram illustrating the structure of the lottery server 3.

An access monitoring section 31 receives requests from terminal devices 4 to access the server 1, and attaches different lottery numbers to each of the terminal devices 4 which have made an access request. This access monitoring section 31 corresponds to the above described receiving section.

Moreover, the access monitoring section 31 also determines whether or not an access situation notification has been received by the access situation notification receiving section 33 within a predetermined time for user IDs (corresponding to the above described terminal device identification information) which have been selected and set based on the lottery results among the information which is stored in the access situation database 52.

As is shown in FIG. 3, the access situation database 32 associates lottery numbers allocated to the terminal devices 4 by the access monitoring section 31 together with lottery results showing either a "successful" or "unsuccessful" status and user IDs, and stores these.

The access situation notification receiving section 33 receives from the terminal devices 4 access situation notification information which shows which terminal devices 4 are accessing the moving picture delivery server 4.

The lottery section 35 selects lottery numbers which have been allocated to terminal devices 4 requesting access from among the access requests received by the access monitoring section 31. Here, the lottery section 35 refers to lottery numbers stored in the access situation database 32, and conducts the lottery so as to decide a number of successes which matches a number which corresponds to a success reference number. This success reference number may be set, for example, as the number of terminals which are able to access the moving picture delivery server 1 and may be set by an input device, or may be set via a communication line from an external device.

The lottery section 35 has a function of associating lottery results showing either "successful" or "unsuccessful" with lottery numbers and then writing these in the access situation database. When it is determined that an access situation notification has not been received by the access monitoring section 31, the lottery section 35 has a function of making a new lottery selection for terminal device identification information whose previous lottery result was unsuccessful.

The lottery result transmitting section 36 transmits connection destination information which is used for accessing the moving picture server 1 to terminal devices 4 which have been successfully selected by the lottery section 35. This connection destination information may be, for example, a URL (uniform resource locator) which identifies a live number delivered from the moving picture delivery server 1.

The lottery result transmitting section 36 transmits connection destination information (here, this is a URL) to terminal devices 4 which were not successful in the lottery to allow them to access the comment delivery server 2 which is a different server from the moving picture delivery server 1.

Figure 4:
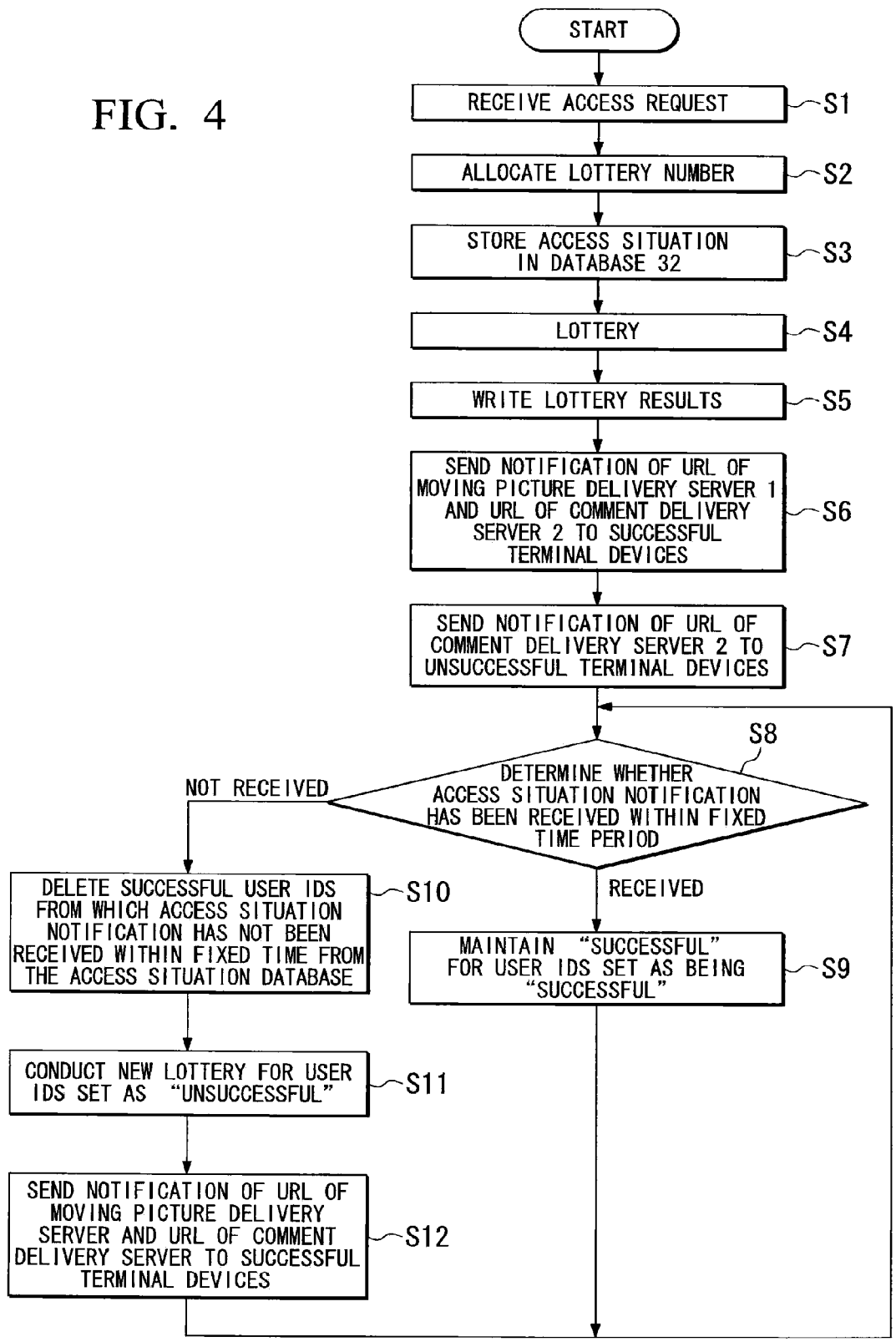
FIG. 4 is a flowchart used to illustrate an operation of a lottery server of an access control system in an embodiment of the present invention.

Next, a description will be given of an access control system having the above described structure. FIG. 4 is a flowchart used to illustrate an operation of the lottery server 3 in an access control system.

Here, a case is described in which a program featuring a well-known performer is streamed as a live broadcast from the moving picture delivery server 1 as the moving picture contents.

Firstly, the program contents are made available in advance by means of a homepage or the like by means of the lottery server 3, and may be viewed on a terminal device 4. Here, a button which a user can click to indicate they wish the moving pictures to be delivered from the moving picture delivery server 1 is provided on the home page. When the user clicks this button, a request to access the moving picture delivery server 1 is transmitted from the user terminal 4 to the lottery server 3. Once the URL has been clicked, this access request is transmitted by the terminal device 4 to the lottery server 3 at fixed time intervals (for example, every 60 seconds).

The access monitoring section 31 of the lottery server 3 receives this access request (step S1), and allocates a lottery number to each terminal which has sent an access request (step S2). The lottery number and user ID included in this access request are then associated together and are then stored in the access situation database 32 (step S3). Next, once a set time (for example, 90 seconds) prior to the commencement of the program broadcast has been reached, the access monitoring section 31 instructs the lottery section 35 to conduct a lottery.

When the lottery section 35 receives the lottery instruction from the access monitoring section 31, it refers to the access situation database 32, and conducts a lottery to decide successful lottery numbers from among the lottery numbers stored in the access situation database 32 (step S4). The lottery section 35 decides the same number of successful lottery numbers as the number of terminal devices permitted to access the moving picture delivery server 1 (set in advance—for example, 300). Next, the lottery section 35 writes information indicating "successful" in the access situation database 32 for the successful lottery numbers, and writes information indicating "unsuccessful" for the unsuccessful lottery numbers (step S5).

When the lottery results have been written in the access situation database 32, the lottery result transmitting section 36 reads the URL which is to be notified to the successful users (i.e., the URL of the moving picture delivery server 1) which the lottery result transmitting section 36 itself is holding, and transmits this read URL and the URL of the comment delivery server 2 to the successful terminal devices 4 (step S6). As a result, the URL of the moving picture delivery server 1 and the URL of the comment delivery server 2 are delivered to the terminal devices 4 of the successful users.

These users are then able to access the moving picture delivery server 1 and watch the program, and are also able to view comments containing opinions and the like about that program which are delivered to their user terminal 4 from the comment delivery server 2.

In contrast, the lottery result transmitting section 36 transmits the URL of the comment delivery server 2 which it is itself holding to the user terminals 4 of unsuccessful users (step S7). As a result, it is possible to view comments delivered from the comment delivery server 2 on the terminal devices 4 of the unsuccessful users.

After the user terminal device 4 has been notified of the successful lottery results, it transmits an access situation notification to the lottery server 3 at fixed time intervals until a command to stop access is input by a user. Here, the terminal devices 4 of successful users and the terminal devices of unsuccessful users both transmit access situation notification to the lottery server 3.

The access situation notification receiving section 33 of the lottery server 3 receives access situation notifications from the terminal devices 4. The access monitoring section 31 refers to the access situation database 32 and determines from the user IDs stored as being successful in the lottery whether or not an access situation notification has been received by the access situation notification receiving section 33 within the fixed time (step S8).

The access monitoring section 31 maintains the "successful" state for user IDs for which the "successful" result was set and for which an access situation notification has been received within the fixed time (step S9). In contrast, the access monitoring section 31 deletes from the access situation database 32 user IDs for which an access situation notification has not been received within the fixed time from the user IDs for which the "successful" result was set (step S10), and instructs the lottery section 35 to conduct a lottery. In addition, the access monitoring section 31 maintains the "unsuccessful" state for user IDs for which the "unsuccessful" result was set and for which an access situation notification has been received within the fixed time, and deletes from the access situation database 32 user IDs for which an access situation notification has not been received within the fixed time from the user IDs for which the "unsuccessful" result was set.

When the lottery section 35 receives the instruction to conduct a lottery from the access monitoring section 31, it conducts another lottery (step S11). Here, the access monitoring section 31 extracts one lottery number (here, this number is the same as the number of deleted user IDs) from among the lottery numbers which were set as being "unsuccessful" and changes this lottery number to "successful", and also rewrites this extracted lottery number from "unsuccessful" to "successful". Next, the lottery result transmitting section 36 transmits the URL of the moving picture delivery server 1 and the URL of the comment delivery server 2 to the newly successful terminal device 4 (step S12). As a result, even if a user is unsuccessful in a lottery, if this user is successful in a subsequent lottery, that user is able to access the moving picture delivery server 1 and watch the contents of the moving pictures, and at the same time is able to view comment information which is delivered to their terminal device 4 from the comment delivery server 2. Note that after step S9 or step S12, the routine returns to step S8.

Note also that once the first lottery has ended, the lottery number and the "unsuccessful" lottery result are set for a terminal device 4 which has accessed the lottery server 3 from among the terminal devices 4, and the user ID thereof is written in the access situation database 32. When access from a terminal device 4 which has been successful is interrupted, then another lottery is held to find another successful terminal device.

Next, a second embodiment will be described. In the first embodiment, a description is given of a case in which user IDs, for which an access situation notification was not able to be received within a fixed time, are deleted from the access situation database 32, and the number of new "successful" results is decided so as to correspond to the number of deleted user IDs. In contrast to this, in the second embodiment, a comparison section (not shown) is provided in the lottery server 3. This comparison section detects the number of accesses to the moving picture delivery server 1 from the terminal devices 4 based on access situation notification information received by the access situation notification receiving section 33, and compares the detected number of accesses with a previously set reference value. This reference value may be stored in advance within a predetermined memory in the comparison section, or may be input from an input device, or may be set from an external device via a communication line.

Based on comparison results from the comparison section, when the access number is less than the reference value, the lottery section 35 conducts a new lottery aimed at terminal devices 4 marked as "unsuccessful" from among those terminal devices 4 which have made an access request but are not currently accessing the moving picture delivery server 1.

In this manner, it is possible to conduct new lotteries in accordance with the number of deleted user IDs, and it is also possible to compare a reference value with the number of user IDs which have been set as "successful", and conduct new lotteries among the "unsuccessful" user IDs so that the number of "successful" user IDs reaches the reference number.

In the above described embodiments, a program featuring a well-known performer may cause accesses from terminal devices to become concentrated due to users wishing to view this program. At these times, restrictions are placed on the number of accesses (i.e., on the number of connected terminal devices). As a result, it is possible to prevent an unforeseen load from being placed on the moving picture delivery server 1 resulting in the moving picture delivery server going down.

Moreover, if some users stop accessing a program while the program is being broadcast, new lotteries are performed in accordance with the number of users who have stopped their accessing, and notification that they have been successful is sent to the successful terminal devices and they are allowed to access the moving picture delivery server 1. As a result, when there is a reduction in the number of accesses and access becomes available to other users, this can be dealt with flexibly, and users who are able to watch can be accepted and allowed to watch.

Moreover, users who were not successful in the lottery are connected to just the comment delivery server 2. As a result of this, although a particular user is not able to watch the contents of moving pictures delivered from the moving picture delivery server 1, that user is able to refer to comment information about the program contents transmitted (i.e., commented) from the terminal devices of users who were successful in the lottery and are watching the program. As a result, users who were unsuccessful in the lottery are able to view information about the program contents while they wait for their user ID numbers to be successful in the lottery. Note that it is also possible to set an image relating to the program (for example, a static image created from a portion of the live program) as the background for the comments while the comments are being referred to.

Note also that in the above described embodiments, a description is given of a case in which a live program is streamed from the moving picture delivery server 1, however, the above described access control can also be performed when contents stored on a database in the moving picture delivery server 1 are being delivered.

Moreover, in the above described embodiments, lottery numbers are allocated and a lottery is conducted in order to select these lottery numbers, however, it is also possible instead of allocating lottery numbers to conduct a lottery in order to select user IDs.

Moreover, it is also possible to perform access control by recording on a computer-readable recording medium a program which realizes the functions of the access monitoring section 31, the access situation notification receiving section 33, the lottery section 35, and the lottery result transmitting section 36 shown in FIG. 2, and by causing this program recorded on a recording medium to be read and executed by a computer system. Note that, here, 'computer system' includes the OS and hardware such as peripheral devices and the like.

Moreover, if a WWW system is being utilized, then 'computer system' can also include a homepage provider environment (or display environment).

'Computer readable recording medium' refers to a storage medium such as a portable medium such as a flexible disc, a magneto-optical disc, ROM, or CD-ROM, or hard disc incorporated in a computer system or the like. Furthermore, 'computer readable recording medium' also includes devices that hold a program dynamically for short periods of time such as communication lines when the program is transmitted via a network such as the Internet or via a communication circuit such as a telephone line, and includes devices which hold a program for a fixed period of time such as the volatile memory incorporated in computer systems which form the servers and clients in the case of the communication lines or networks described above. The above described program may realize a portion of the above described functions or may realize the above described functions in combination with a program which has already been recorded on a computer system.

Embodiments of the present invention have been described in detail above with reference to the drawings, however, the specific structure of the present invention is not limited to these embodiments and other designs and the like are also included insofar as they do not depart from the spirit or scope of the present invention.

INDUSTRIAL APPLICABILITY

The present invention can be applied to systems which deliver information from a server to terminal devices, and makes it possible to control terminal devices which are accessing a server without access rights needing to be granted to each individual terminal device.

The invention claimed is:

1. An access control device which controls access to a moving picture delivery server from a plurality of terminal devices, comprising:
   a receiving section which receives access requests from the terminal devices to access moving pictures from the moving picture delivery server;
   a lottery section which conducts a lottery for the terminal devices making the access requests from among the access requests received by the receiving section; and
   a lottery result transmitting section which transmits connection destination information necessary to access the moving picture delivery server to the terminal devices which are successful in the lottery conducted by the lottery section, and transmits connection destination information necessary to access another server which is different from the moving picture delivery server and which delivers information relating to the moving pictures accessed by the terminal devices which are unsuccessful in the lottery conducted by the lottery section.

2. The access control device according to claim 1, comprising:

an access situation notification receiving section which receives access situation notification showing that a terminal device is accessing the moving picture delivery server from the terminal device; and an access situation storage section which stores lottery results from the lottery section in association with identification information for terminal devices, wherein:

the receiving section determines whether or not the access situation notification is received within a predetermined time period by the access situation notification receiving section with respect to the terminal device identification information associated with the lottery results being set as successful among the information stored in the access situation storage section; and when it is determined that access situation notification is not received by the receiving section, the lottery section conducts a new lottery targeting the terminal device identification information associated with the lottery results being set as unsuccessful among the information stored in the access situation storage section.

3. An access control method which is used by an access control device which controls access to a moving picture delivery server from a plurality of terminal devices, comprising:

receiving requests from the terminal devices to access moving pictures from the moving picture delivery server;

conducting a lottery for the terminal devices making the access requests from among the received access requests; and transmitting connection destination information necessary to access the moving picture delivery server to the terminal devices which are successful in the lottery, and transmitting connection destination information necessary to access another server which is different from the moving picture delivery server and which delivers information relating to the moving pictures accessed by the terminal devices which are unsuccessful in the lottery.

4. A computer-readable recording medium which stores an access control program which causes a computer which controls accesses to a moving picture delivery server from a plurality of terminal devices to execute functions of:

receiving requests from the terminal devices to access moving pictures from the moving picture delivery server;

conducting a lottery for the terminal devices making the access requests from among the received access requests; and transmitting connection destination information necessary to access the moving picture delivery server to the terminal devices which are successful in the lottery, and transmitting connection destination information necessary to access another server which is different from the moving picture delivery server and which delivers information relating to the moving pictures accessed by the terminal devices which are unsuccessful in the lottery.

5. The access control device according to claim 1, wherein the another server is a comment delivery server which delivers comment information transmitted from the terminal devices which are successful in the lottery conducted by the lottery section in response to the moving pictures delivered by the moving picture delivery server.

6. The access control device according to claim 1, wherein the another server delivers one or both of comment information transmitted from the terminal devices which are successful in the lottery conducted by the lottery section in response to the moving pictures delivered by the moving picture delivery server, and a static image relating to the moving pictures.

7. The access control device according to claim 2, wherein the another server is a comment delivery server which delivers comment information transmitted from the terminal devices which are successful in the lottery conducted by the lottery section in response to the moving pictures delivered by the moving picture delivery server.

8. The access control device according to claim 2, wherein the another server delivers one or both of comment information transmitted from the terminal devices which are successful in the lottery conducted by the lottery section in response to the moving pictures delivered by the moving picture delivery server, and a static image relating to the moving pictures.

* * * * *